Feb. 8, 1955  N. L. DOOTSON  2,701,593
ORANGE JUICER
Filed July 16, 1952

INVENTOR

Norman L. Dootson

BY

ATTORNEY

2,701,593

ORANGE JUICER

Norman Leslie Dootson, San Francisco, Calif., assignor of one-half to Winifred M. Colombo, San Francisco, Calif.

Application July 16, 1952, Serial No. 299,168

5 Claims. (Cl. 146—3)

The invention relates to orange juicers of the reamer type which are usually made of glass or plastic, and consisting of a dish or bowl with a reamer in the center.

It has for its chief object to provide a juicer of this type with a novel and convenient orange cutting support and positioner and juice catcher for the orange while it is being cut in half, prior to reaming, and thus eliminating the present practice of cutting the orange on the sink, table top, or table cloth, or separate cutting board, etc., which makes a mess sometimes or a cut table cloth and causes the loss of a certain amount of orange juice which oozes out when the orange is cut.

Figure 1:
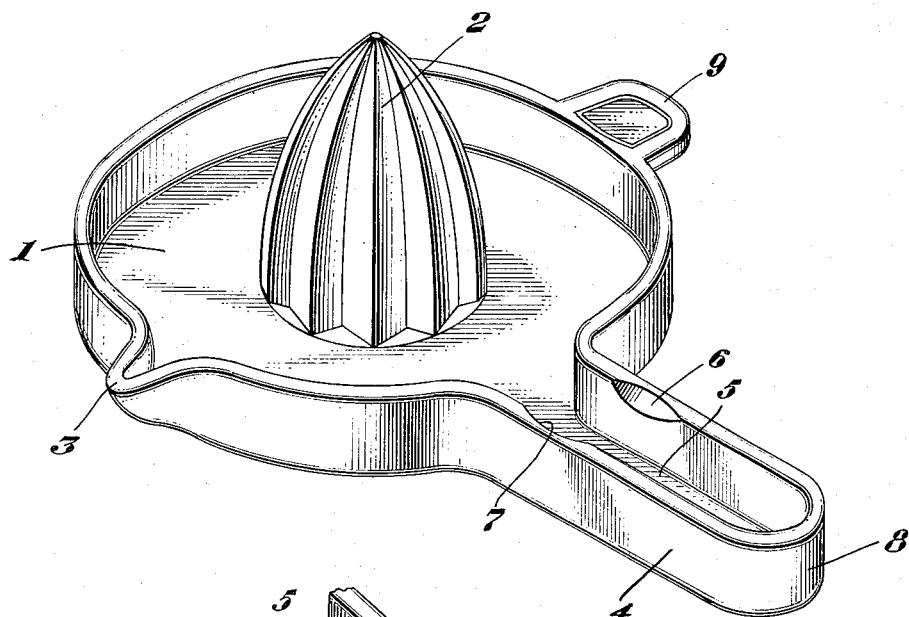

Referring to the drawing, Figure 1 is a perspective view of my improved orange juicer. It has the usual bowl 1, orange reamer 2, and pouring lip 3. Arm 4 extends outwardly from bowl 1, and has a channel 5, extending lengthwise of said arm 4, and open along the upper side, and opening at its inner end to the bowl, and closed by a wall 8 at its outer end. Cooperating notches or seats 6, and 7, are formed adjacent the upper edges of arm 4 positioned substantially midway between reamer 2, and end wall 8, of arm 4, and which are adapted to receive and center and support an orange while it is being cut in half. Channel 5 catches the oozing juice, and since the orange does not contact the bottom surface of channel 5, the knife cuts through more cleanly and easily, and the cutting edge does not become dulled against the glass bottom. The under side of arm 4 is level with the bottom of the bowl so as to be adapted to rest flat on the table or other surface upon which the bowl is placed so as to provide a firm base for the juicer in cutting the orange.

The length of arm 4, and the position of seats 6 and 7, should be adapted to allow for a free unhampered stroke of the knife in cutting the orange in halves preparatory to applying the halves to the reamer in the conventional manner.

Arm 4 can either be used as a handle in pouring the juice out of the bowl, or a separate thumb and finger grip handle 9, at the edge of the bowl opposite the pouring lip, may be employed, in which case the end wall 8, of arm 4, can more conveniently serve as a pouring lip.

Figure 2:
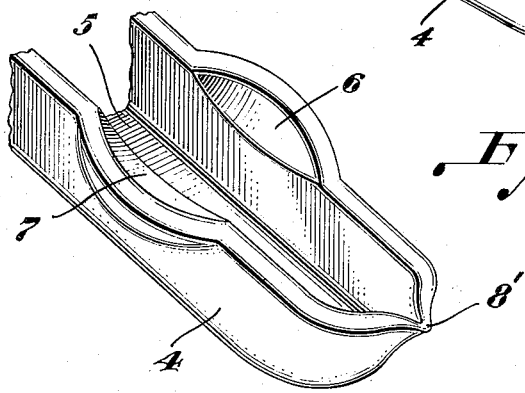

Figure 2 shows a slight modification of arm 4. Seats 6 and 7 are widened out somewhat beyond the width of the arm and made cup-shaped and deep enough so as to better hold the orange halves upright after being cut. The end wall is preferably formed in the shape of a pouring lip 8', though this detail is optional.

Having thus described by invention, what I claim is:

1. In an orange juicer having a bowl with a standing reamer therein, an arm extending laterally from the bowl formed with a longitudinal channel open along its upper side and open at its inner end into the bowl, said arm provided with seat means shaped and adapted for supporting and centering an orange above the open channel for cutting in half and whereby a knife blade in cutting the orange may pass clear through the orange and into the channel, and the consequent seepage will drip into the open channel.

2. In an orange juicer as set out in claim 1, said seat means being substantially cup-shaped and deep enough to hold the orange halves in an upright position after being cut.

3. In an orange juicer as set out in claim 1, the undersides of said bowl and arm being substantially level when the juicer is placed on a table so as to support both the handle and the bowl.

4. In an orange juicer as set out in claim 1, the outer end of said channel being closed by a standing wall adapted to be used as a pouring lip to empty the contents of the bowl through the channel.

5. In an orange juicer having a bowl with a standing reamer therein, an arm extending laterally from the bowl formed with a longitudinal channel open along its upper side and open at its inner end into the bowl, said arm provided with cooperating orange seating and aligning means at opposite points along the channel projecting beyond the sides of the arm adapted to be grasped by the hand in picking up the juicer.

References Cited in the file of this patent

UNITED STATES PATENTS

| Number | Name | Date |
|---|---|---|
| 569,747 | Curley | Oct. 20, 1896 |
| 793,189 | Groundman | June 27, 1905 |
| 1,105,114 | Tsuru | July 28, 1914 |
| 1,941,164 | Ciampa | Dec. 26, 1933 |